(12) United States Patent
Stephens et al.

(10) Patent No.: US 8,461,708 B2
(45) Date of Patent: *Jun. 11, 2013

(54) WIND DRIVEN POWER GENERATOR

(75) Inventors: Thomas Glenn Stephens, Grand Prarie, TX (US); Stephen C. Else, Dallas, TX (US)

(73) Assignee: Broadstar Investment Company, LLC, Hartford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/868,527

(22) Filed: Aug. 25, 2010

(65) Prior Publication Data

US 2011/0272948 A1    Nov. 10, 2011

Related U.S. Application Data

(63) Continuation of application No. PCT/US2009/035163, filed on Feb. 25, 2009.

(60) Provisional application No. 61/031,317, filed on Feb. 25, 2008.

(51) Int. Cl.
*F03D 9/00* (2006.01)

(52) U.S. Cl.
USPC .............................................. 290/44; 290/55

(58) Field of Classification Search
USPC ...................................................... 290/44, 55
See application file for complete search history.

(56) References Cited

U.S. PATENT DOCUMENTS

| | | | |
|---|---|---|---|
| 4,355,955 A * | 10/1982 | Kisovec | 416/23 |
| 7,911,076 B2 * | 3/2011 | Stephens et al. | 290/55 |
| 2008/0042445 A1 * | 2/2008 | Stephens | 290/55 |

* cited by examiner

*Primary Examiner* — Tho D Ta
(74) *Attorney, Agent, or Firm* — The Emanuelson Firm; Kenneth Thomas Emanuelson

(57) ABSTRACT

A wind driven generator includes a rotor disposed in a cylindrical duct and supported by a frame for rotation in response to wind flowing through the duct. The rotor includes plural circumferentially spaced paralleled rotor blades supported for rotation about a generally horizontal axis. Each blade is supported for pivotal movement to change blade pitch, angle of attack or camber as the rotor rotates. A pitch or camber control motor, self-governing wind vane mechanism, or governing mechanism is operable to move a circular cam to vary blade pitch or camber to control rotor speed. The duct is mounted on a mast having a base supported on a foundation for pivotal movement to face the wind for maximizing air flow through the duct. Electric power generators are connected to opposite ends of the rotor at respective power output or drive shafts.

17 Claims, 21 Drawing Sheets perspective view

WIND DRIVEN POWER GENERATOR

INCORPORATION BY REFERENCE TO RELATED APPLICATION(S)

This application is a CON of PCT/US2009/035163, filed Feb. 25, 2009 which claims benefit of 61/031,317, filed Feb. 25, 2008 which are hereby incorporated by reference.

BACKGROUND OF THE INVENTION

Wind driven power generators are under intensive development as energy needs and the costs associated therewith continue to escalate. With the development of wind driven power generators certain needs have become apparent, including the need to provide a generator which overcomes the disadvantage of conventional airscrew or propeller type generators which must be mounted at a substantial height above the surface, are not aesthetically pleasing, are a hazard to airborne wildfowl, and are susceptible to ice accumulation on the propeller blades.

There has been a continuing need and desire for improvements in wind driven power generators, including the desire to overcome the shortcomings of conventional power generators such as those described hereinabove, while also providing a generator which is efficient, physically compact and is easily adapted to varying wind velocity conditions while retaining the capability of power generation. It is to these ends, as well as other desiderata and needs which will be apparent to those skilled in the art, that the present invention has been developed.

SUMMARY OF THE INVENTION

The present invention provides an improved wind driven power generator.

The present invention also provides a wind driven power generator which includes a unique rotor or propeller configuration, is compact and less obtrusive than conventional airscrew or propeller type generators and includes a rotor which may be disposed within a shroud or duct for efficiency improvements while minimizing hazards to bird life and while being less susceptible to performance degradation or structural problems associated with ice or snow accumulation, for example.

In accordance with an important aspect of the present invention, a wind driven power generator is provided with a rotor having circumferentially spaced airfoil shaped blades which are arranged in a circular pattern not unlike a so-called paddle wheel and which have a mechanism associated therewith for varying the "lift" of the rotor blades to provide a resultant driving force in response to wind flowing thereover. Thus, the blades effect rotation of the rotor to provide a useful result, such as driving an electric power generator.

In accordance with another important aspect of the present invention, a wind driven power generator is provided which includes a rotor which is characterized by a unique multi-blade pitch change mechanism for varying blade pitch or angle of attack as the blades rotate about an axis generally parallel to the blade length. The multi-blade rotor may be adapted to be connected to one or two electric power generators, or other power generating devices, and the speed of the rotor may be controlled to provide for variable power output and/or at a selected electrical energy characteristic.

In accordance with still another important aspect of the present invention, a wind driven power generator is provided which includes a rotor comprising rotor blades which have an airfoil shape and wherein the camber or curvature of the airfoil maybe varied. In this way the "lift" forces exerted by the rotor blades or vanes may be selectively converted into a resultant useful force for driving the rotor. An articulated rotor blade configuration, together with a blade camber change mechanism, provides the useful resultant force of the rotor exerted by the blades as the rotor rotates.

In accordance with yet a further aspect of the invention, a wind driven power generator is provided which includes rotor speed control means including an embodiment which is self-governing in relation to the velocity of wind flowing over the rotor.

In accordance with yet a further aspect of the present invention a wind driven power generator is provided wherein a rotor which is responsive to wind flowing thereover rotates within a duct or shroud to improve rotor efficiency, and minimize the adverse effects of rain, or snow or ice accumulation on the rotor or flow of such through the duct. The duct is particularly advantageous in that there are provided paths for the flow of cooling air over one or more electric generators connected to the rotor. Still further, the rotor duct or shroud is preferably configured to accelerate the flow of air through the duct and the duct is also configured to modify or improve the weather vaning tendency of the generator so that the duct opening is normally oriented to take advantage of the direction of the wind.

In accordance with another aspect of the invention is a wind turbine power generator having two or more rows of rotor blades where at least one row is in either fixably or variably adjustable to receive wind flow.

In accordance with yet another aspect of the present invention is a wind turbine power generator that may attached to a base portion for positioning among surfaces such building roofs and the like.

In accordance with yet another aspect of the invention is an embodiment where the wind turbine power generator having a concentrator to facilitate air flow to the turbine and the turbine may be provided in a multiple side-to-side arrangement forming an array.

In accordance with another aspect of the present invention, the wind turbine power generator is fixedly attached to a structure through a support structure having a unique configuration.

In accordance with an aspect of the invention, a wind turbine power generator is provided that may be paired with at least one other turbine to form a unit about axis in a stacked arrangement to form a tower-like structure to reduce the overall footprint of a multiple wind-generating system.

In accordance with another aspect of the invention, a wind turbine power generator is provided with its axis of rotation oriented vertically that may be present in a side-to-side arrangement and/or with concentrator to direct air flow towards the at least one turbine.

In accordance with yet another aspect of the invention, a wind power turbine generator having governor mechanism in communication with a cam design to regulate rotational velocity of the rotor blades.

Those skilled in the art will further appreciate the above-mentioned advantages and superior features of the invention together with other important aspects thereof upon reading the detailed description which follows in conjunction with the drawings.

DETAILED DESCRIPTION OF THE PREFERRED EMBODIMENTS

Figure 1:
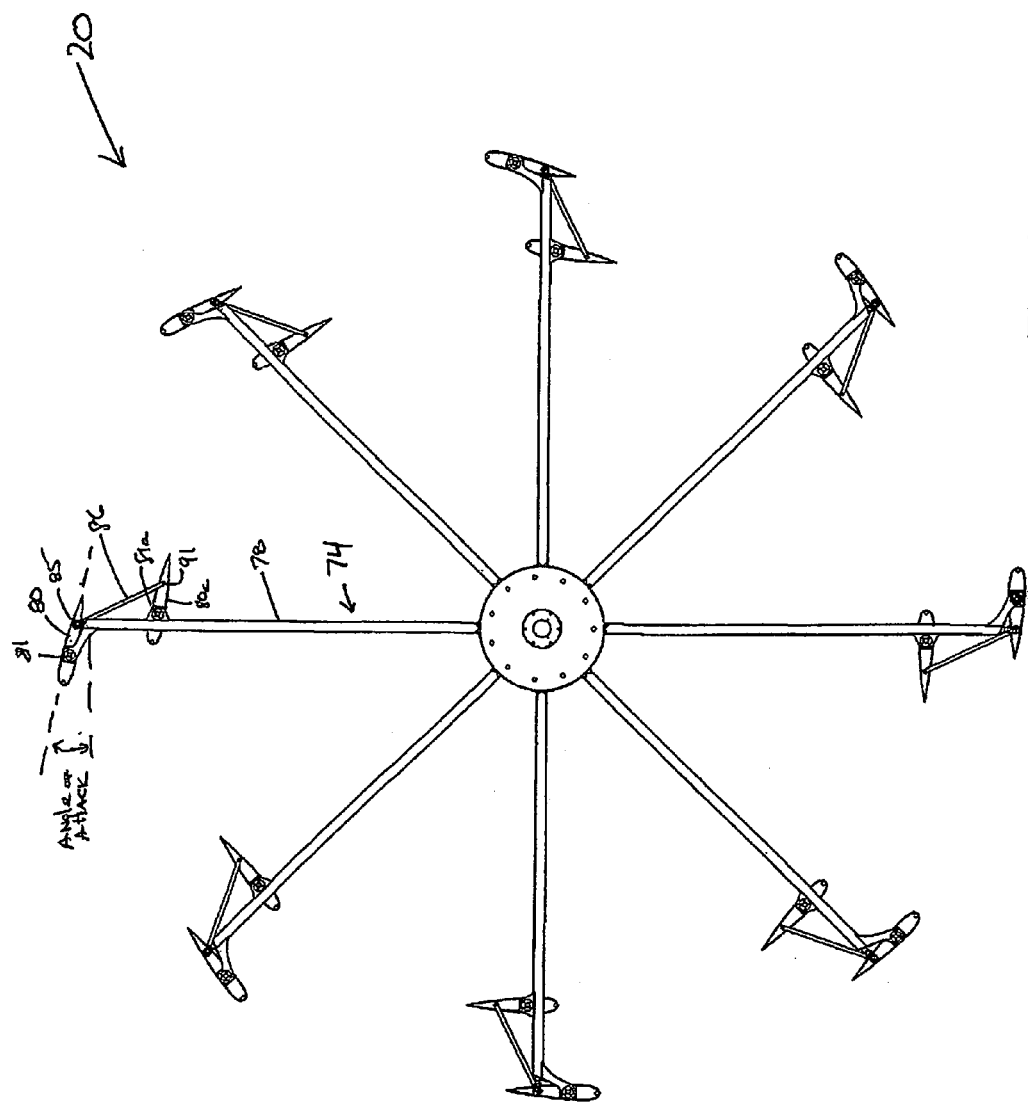
FIG. 1 is a side view of one preferred embodiment of a wind driven power generator in accordance with the invention.

In the description which follows, like parts are marked throughout the specification and drawings with the same reference numerals, respectively. The drawing figures may not be to scale and certain features may be shown exaggerated in scale or in somewhat schematic form in the interest of clarity and conciseness.

Figure 2:
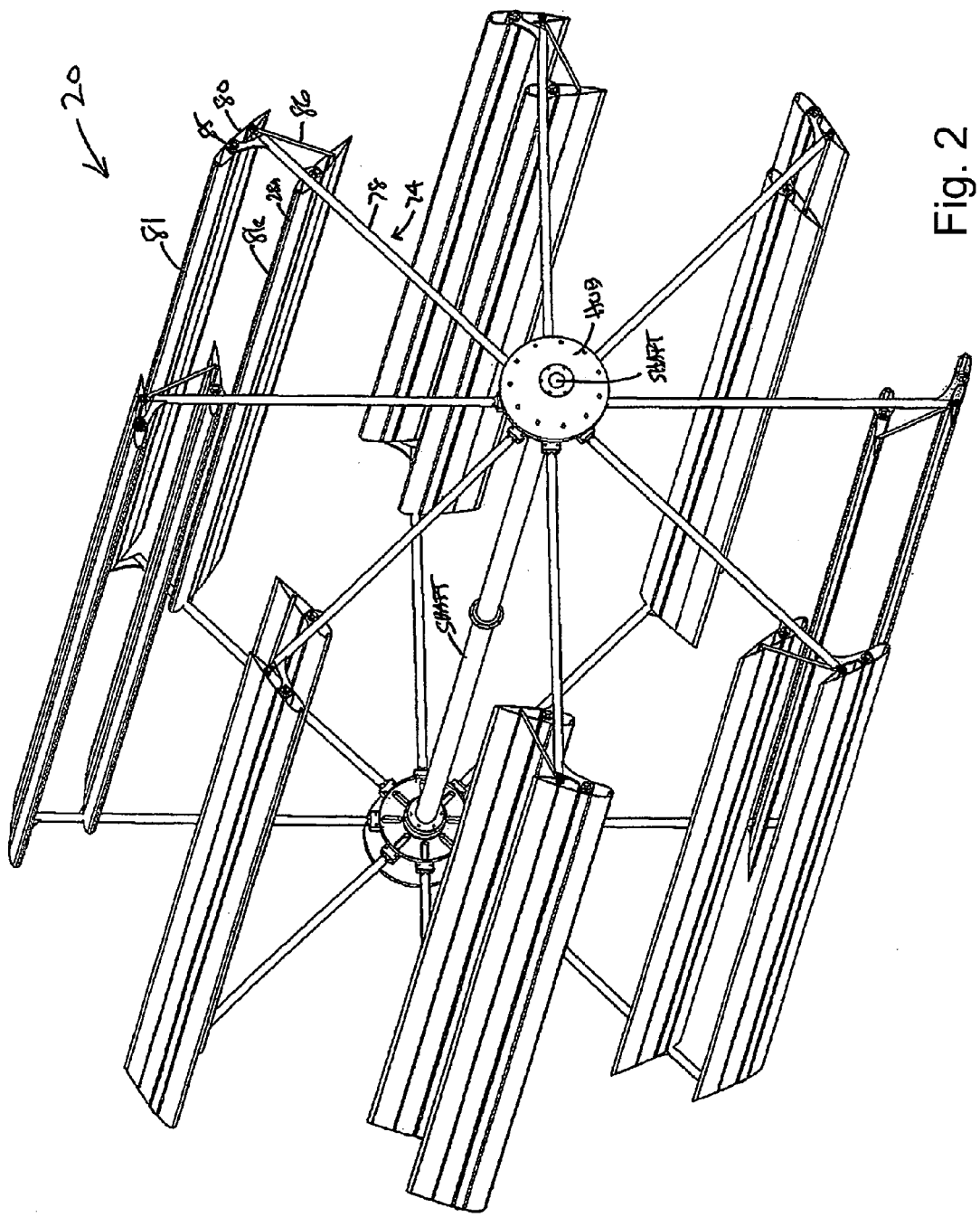
FIG. 2 is a perspective view similar to FIG. 1.

FIGS. 1 and 2 show wind turbine power generator with its axis of rotation oriented horizontally. In a variable movement embodiment, rotor blade 80 pivots at pin 81 and is connected to arm assembly 74. Movement of rotor blade 80 via arm assembly 74 causes movement of rotor blade 81a via linkage arm 86 about pin A. In another embodiment, rotor blade 81a may be fixedly attached to arm assembly 74.

FIGS. 3-6 show an embodiment of wind turbine power generator 20 with its axis of rotation oriented horizontally. Wind turbine 20 has end covers 160 and 176, with end cover 160 having outer surface 162 for connection at the general vicinity of the center of gravity of generator 20 about area A to support structure 167 that can accept a base structure 184 (shown in FIG. 5). Support structure 167 has slot 170 formed by spaced apart portions 170 and 174 that engage base structure 184. Alternatively, a converse arrangement is contemplated wherein the base structure 184 could include spaced apart portions to accept an embodiment of the support structure having a single panel to hold the wind turbine. In FIGS. 3-6, generator 20 is shown with screening connected between and about the periphery of the end covers 160 and 176, that although preferred, is not required for the operation of the generator.

Figure 5:
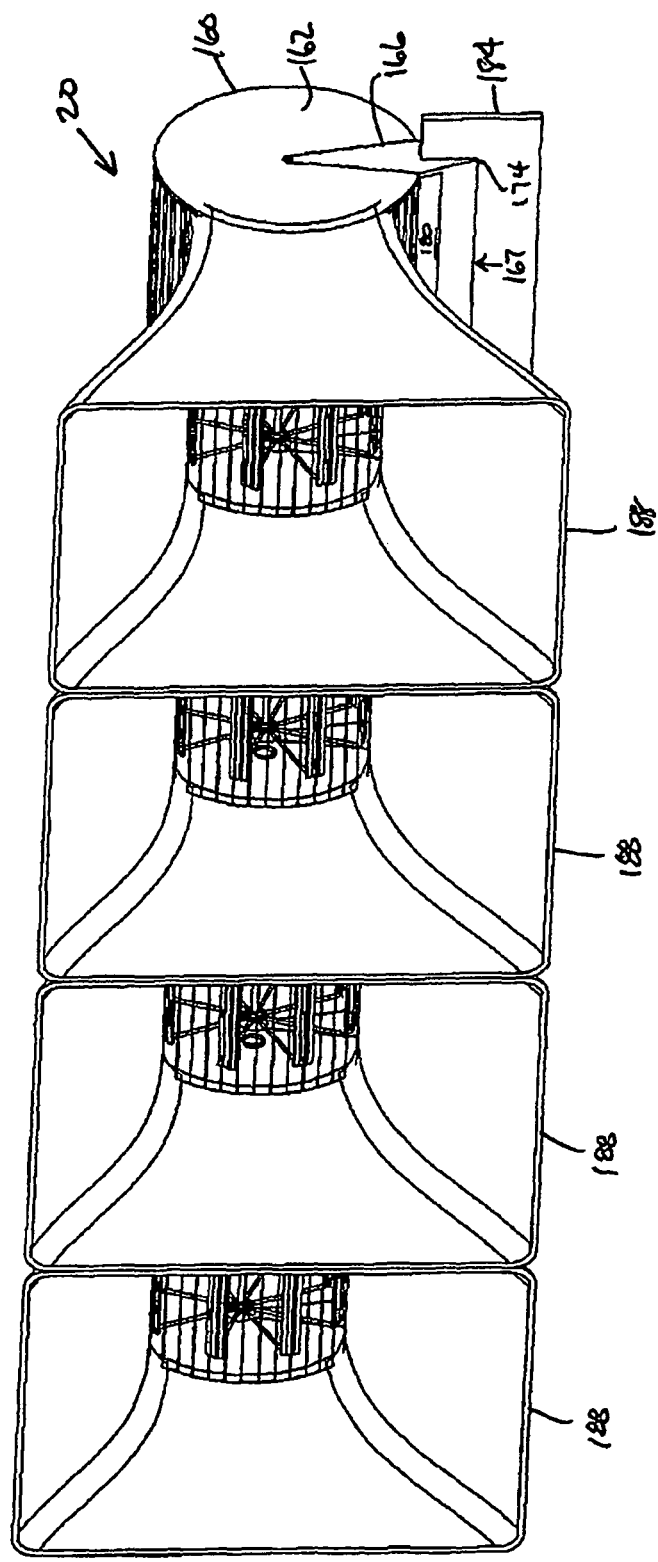
FIG. 5 is a perspective view of a wind turbine power generator having a base structure.
Figure 6:
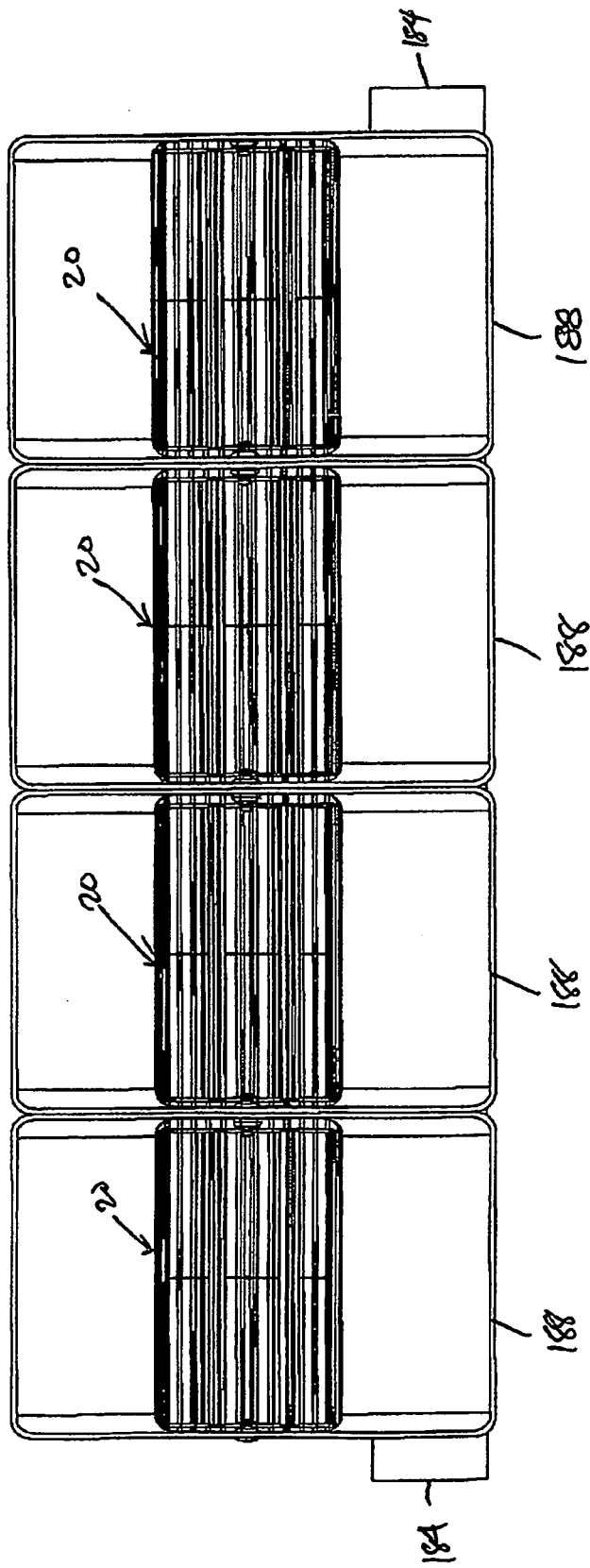
FIG. 6 is a front view similar to FIG. 5.

FIG. 5 shows an embodiment of wind turbine power generator 20 in a multiple side-to-side arrangement and with each having a wind concentrator 188, with an exemplary form shown, in substantial relation thereto to direct airflow to one or more generators. It is to be understood that concentrator 188 can assume various forms, but it is particularly preferred that the form increase the speed of air flow across the rotor blades of the wind turbine.

Figure 7:
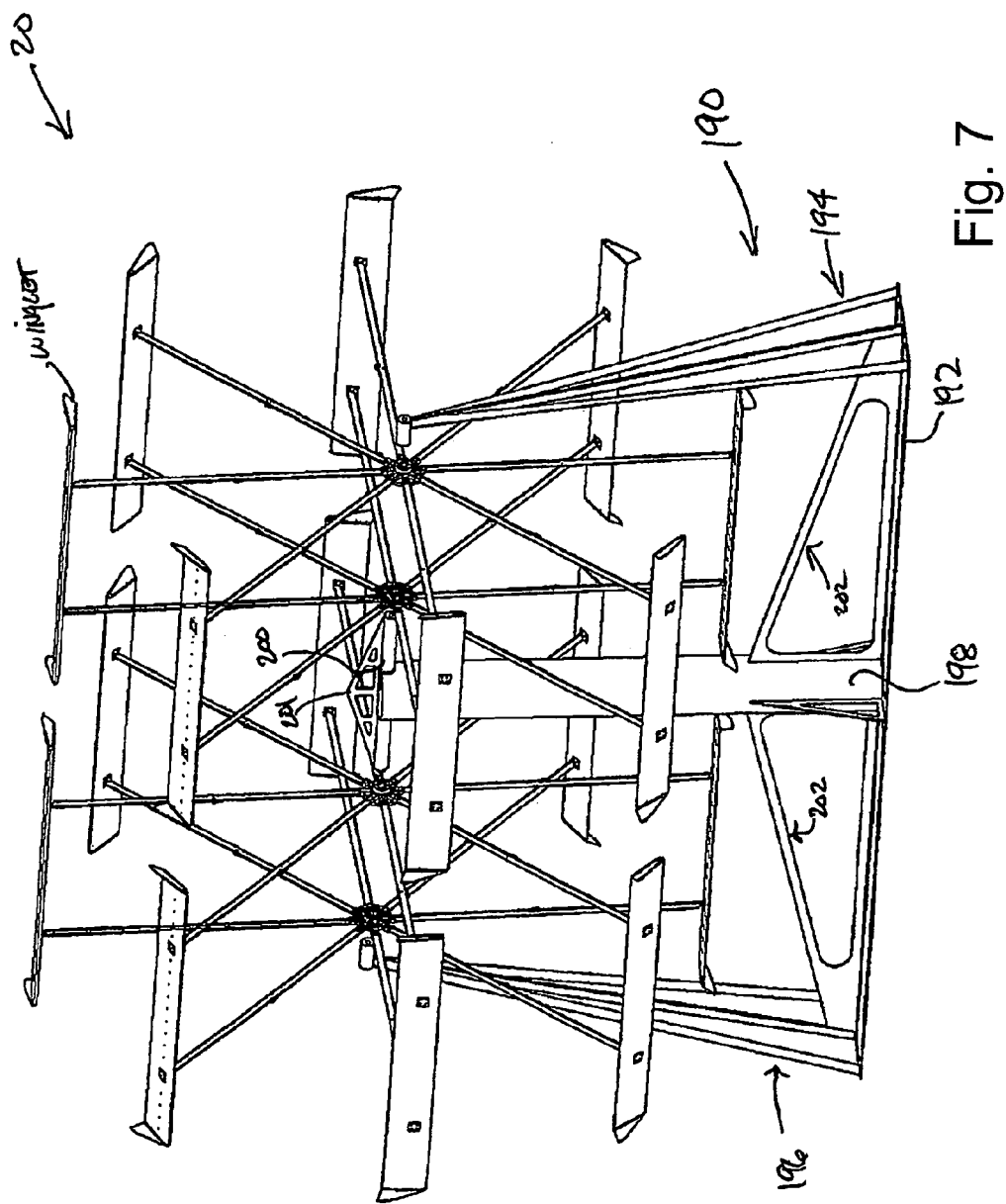
FIG. 7 is a perspective view of a multiple wind power turbine power generators in an embodiment of the present invention.
Figure 8:
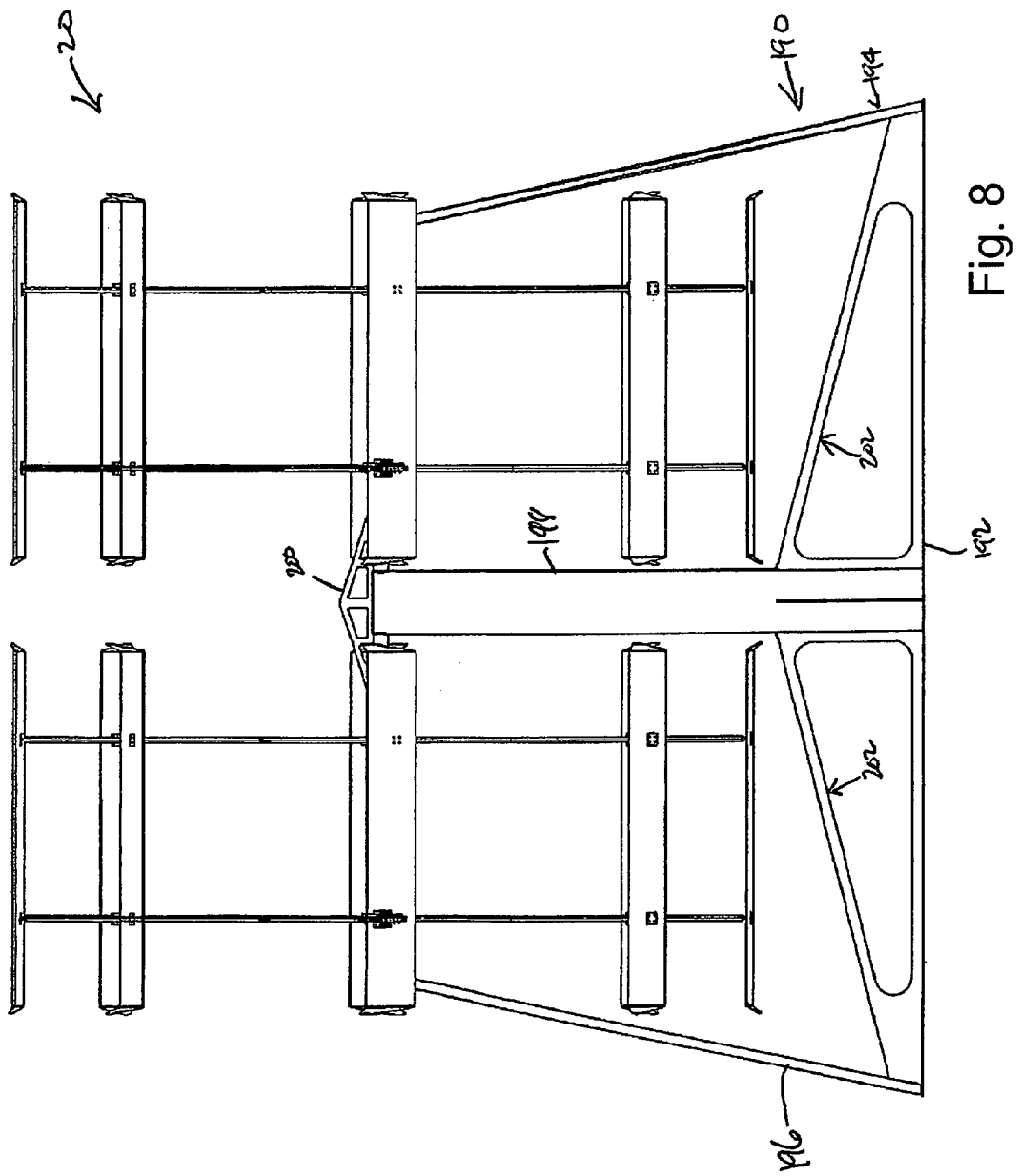
FIG. 8 is a front view similar to FIG. 7.

FIGS. 7 and 8 show an embodiment of the wind turbine power generator 20 with its axis of rotation oriented horizontally for mounting on a surface. A particularly preferably application of this generator is for attachment to the top of an elevated structure, such as building roof. Generator 20 is supported by structure 190 that includes base 192 and end supports 194 and 196 that are for attachment to the outer ends of hub or shaft of the wind turbine. The second end of the rotor blade hub or shaft is attached for support to middle support 198 having transverse connector 200 that may be reinforced with one or more braces 201 and end supports 194 and 196 may be reinforced with brace 202 attached to end supports and to base 192 as show in FIG. 7. One of ordinary skill in the art would appreciate any suitable bracing structure could be used.

Figure 9:
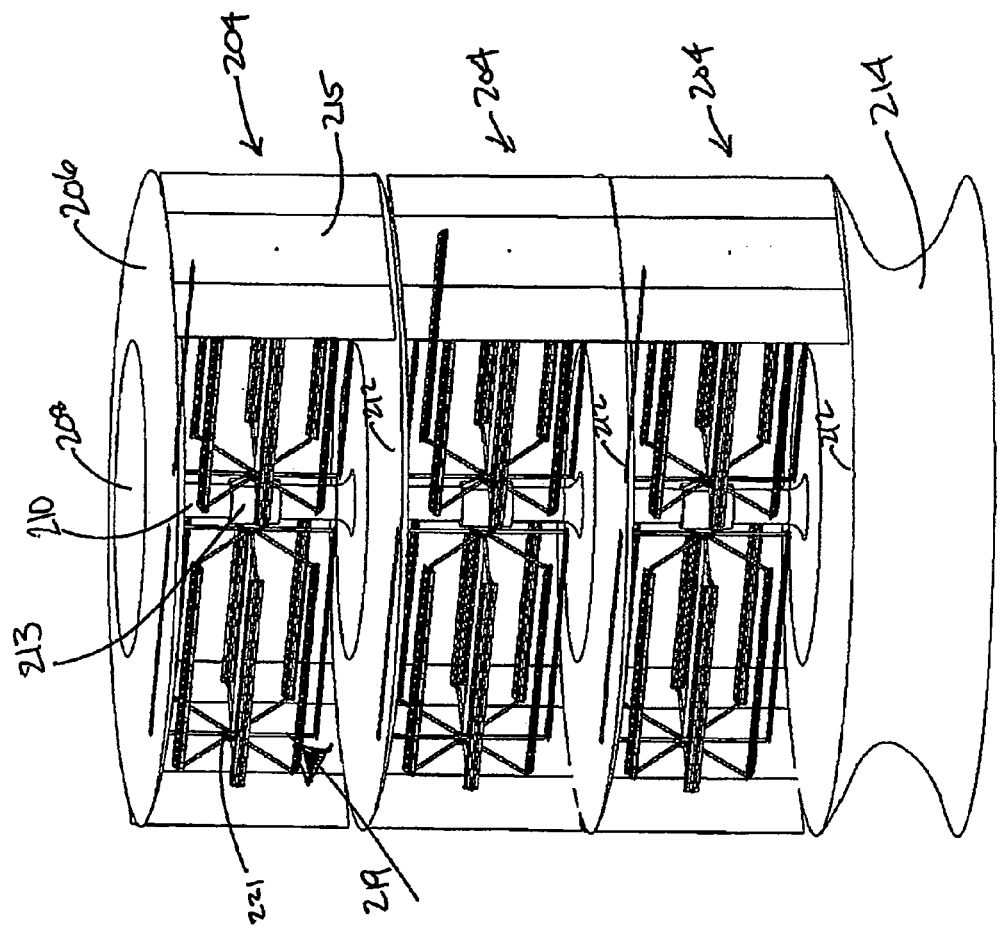
FIG. 9 is a somewhat schematic perspective view of a wind power turbine generator with a different base structure from that of FIG. 5.
Figure 10:
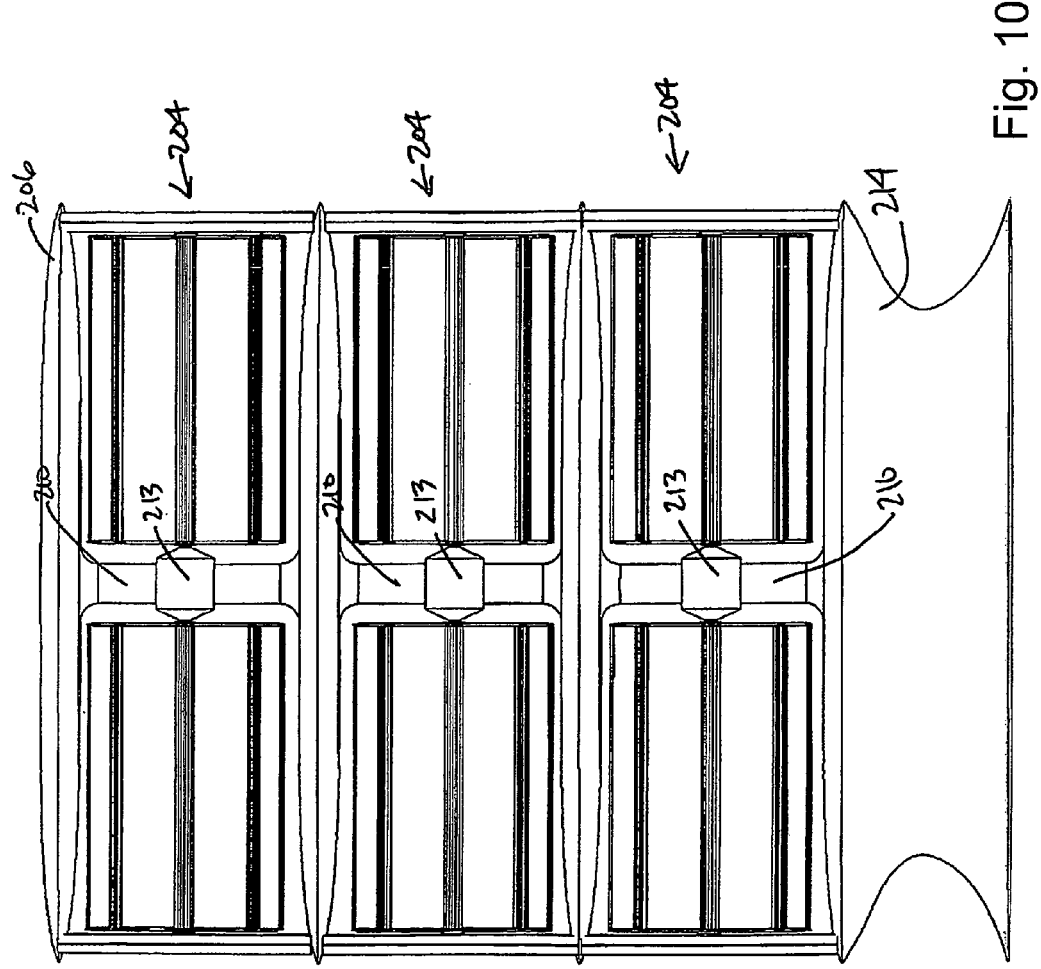
FIG. 10 is a front view similar to FIG. 9.

FIGS. 9 and 10 show an embodiment of the wind turbine power generator 20 with its axis of rotation oriented horizontally. Turbine 20 may be paired with another turbine 20 to form a unit 204 about axis 208 (shown) where the inward-facing end of generator shaft is attached to collet 213 about column 210 (see FIG. 10) that is supported by base 212. The outer shaft end 221 is attached to outer wall 215 that serves to direct air flow shown by arrow 219 generally towards the open area 217 of unit 204. Unit 204 may be provided in an stacked in a vertical arrangement resembling a tower as shown in FIGS. 9 and 10 and optionally having a base like structure 214 to elevate at least one unit 204 above ground.

Figure 11:
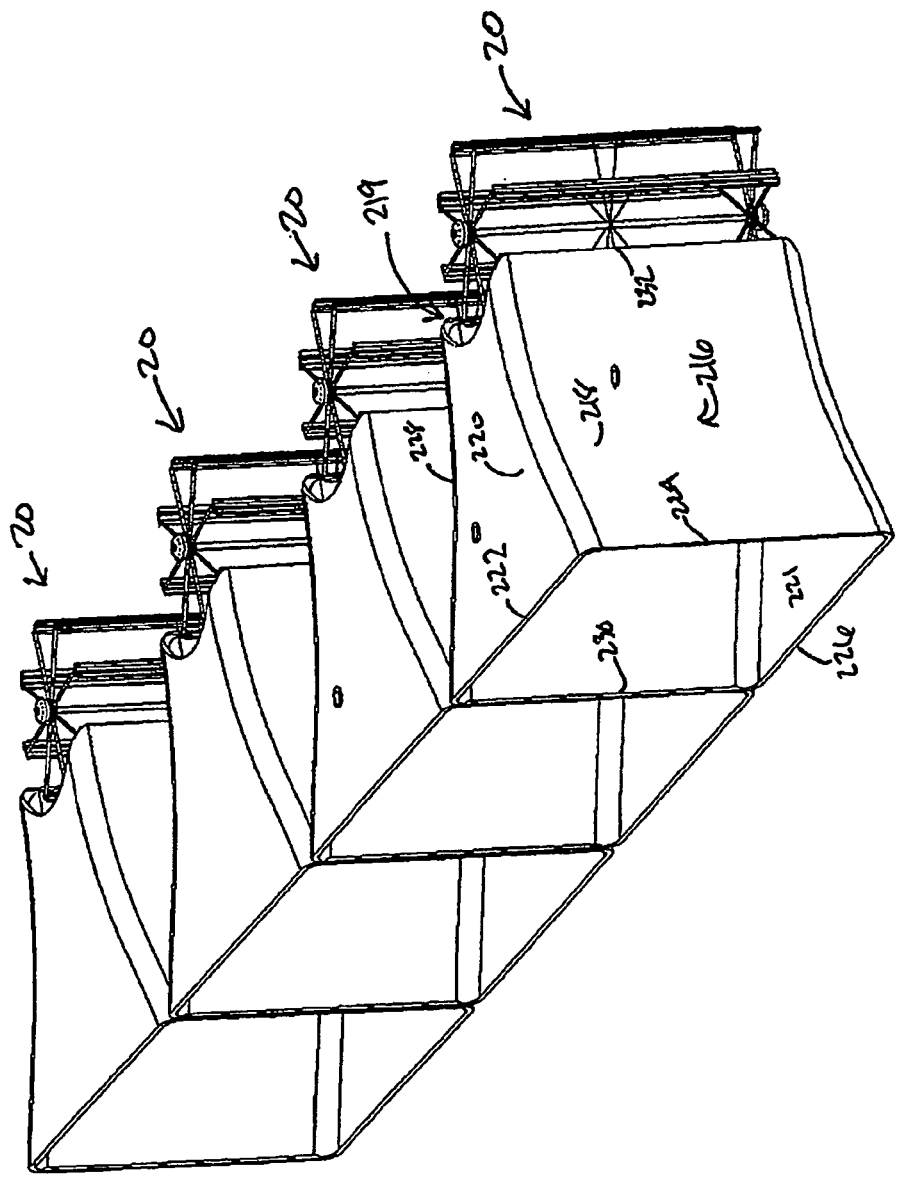
FIG. 11 is a perspective view of a series of wind turbine power generators of the present invention oriented vertically each in combination with a concentrator.
Figure 12:
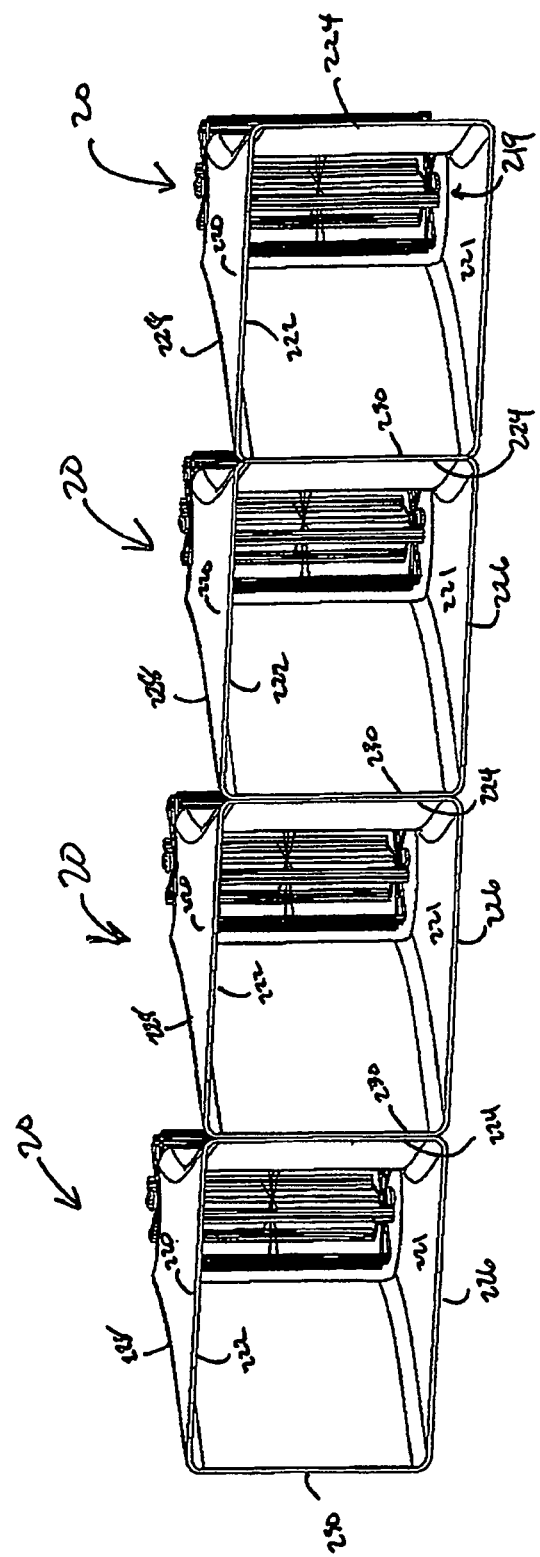
FIG. 12 is another perspective view of the wind turbine power generators similar to FIG. 11 but having a more frontal aspect showing the rotor blades through the concentrator.

FIGS. 11 and 12 show an embodiment of more than one wind turbine power generator 20 with its axis of rotation oriented vertically in a side-to-side arrangement with respect to the direction of wind flow characterizing the front (for all figures) with each generator 20 having about its front a respective concentrator 226. More particularly, concentrator 226 in the general form of a sleeve where the front opening is defined by bottom edge 226, side edges 224 and 230 and top edge 222 that receive air flow and direct towards generator 20. Concentrator 226 tapers toward the back to form a narrower back opening (partially shown in FIG. 11) at back portion 219. Back portion 219 of top surface 220 and bottom surface 221 are concave with respect to turbine 20 so that the back portion 219 substantially adjacent to the outer periphery of rotation of the rotor blades 81 of turbine 20 to minimize air loss that could reduce wind speed.

Figure 3:
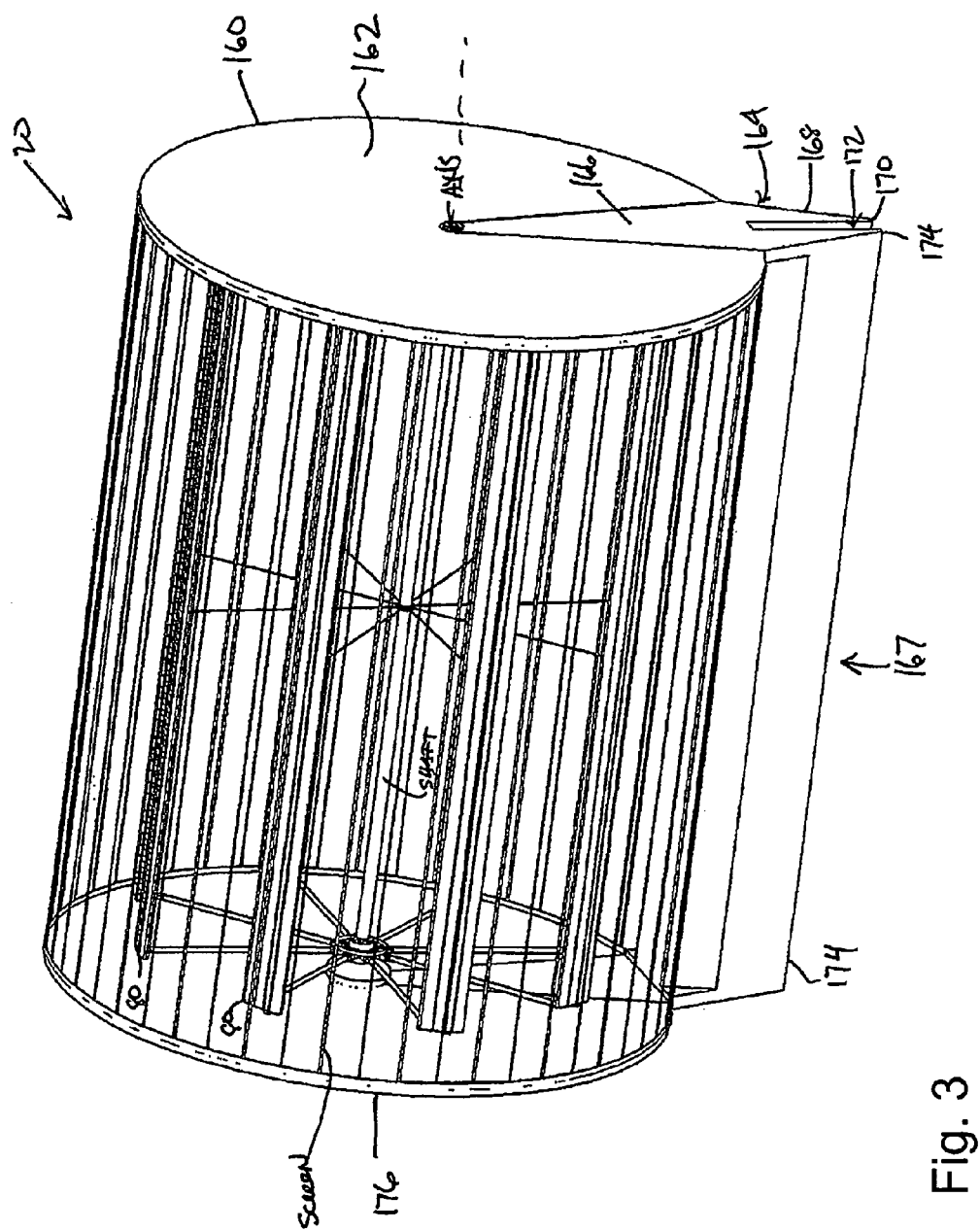
FIG. 3 is a perspective view of a series of wind turbine power generators each having a concentrator.
Figure 4:
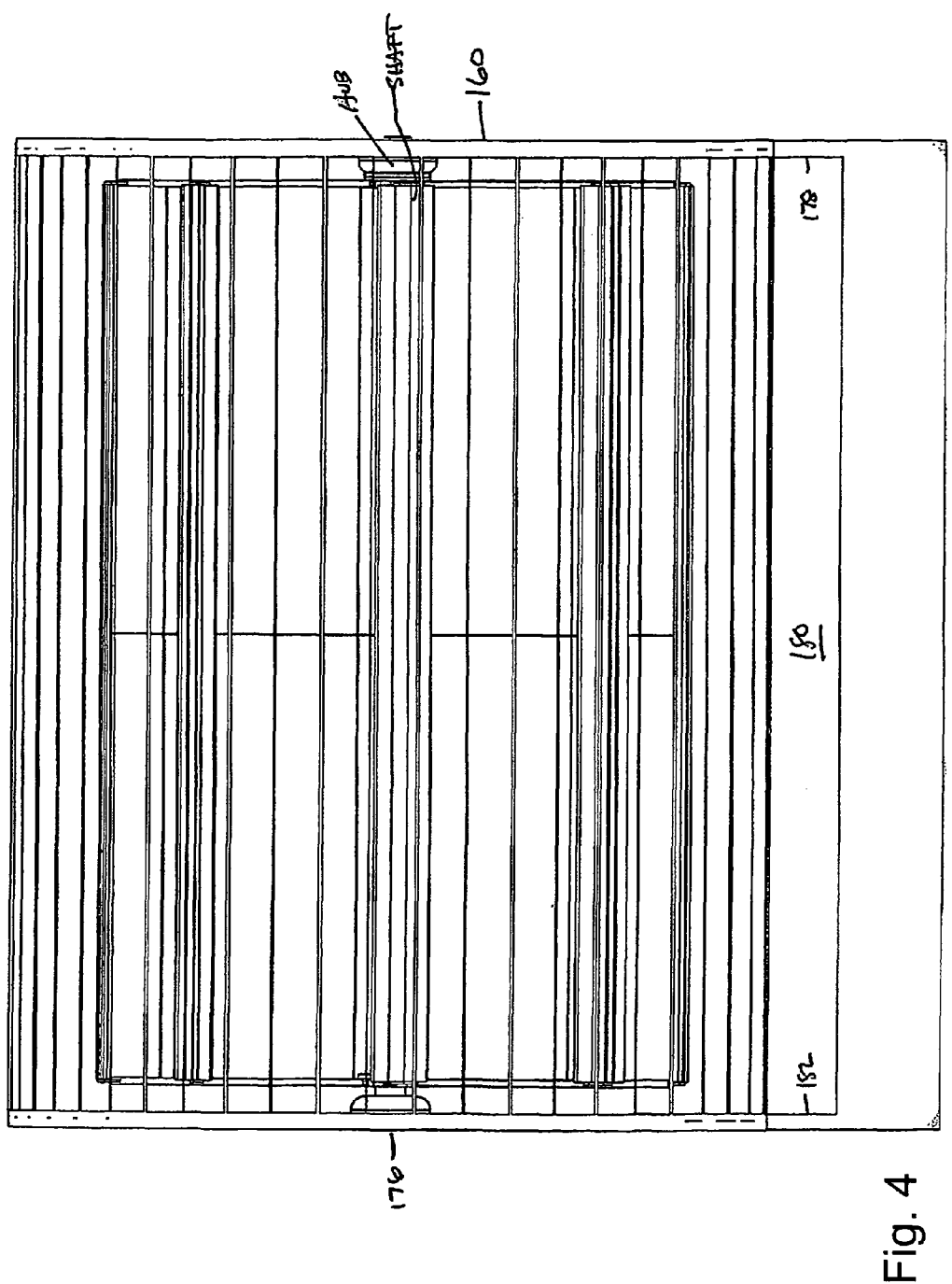
FIG. 4 is front view similar to FIG. 3.
Figure 13:
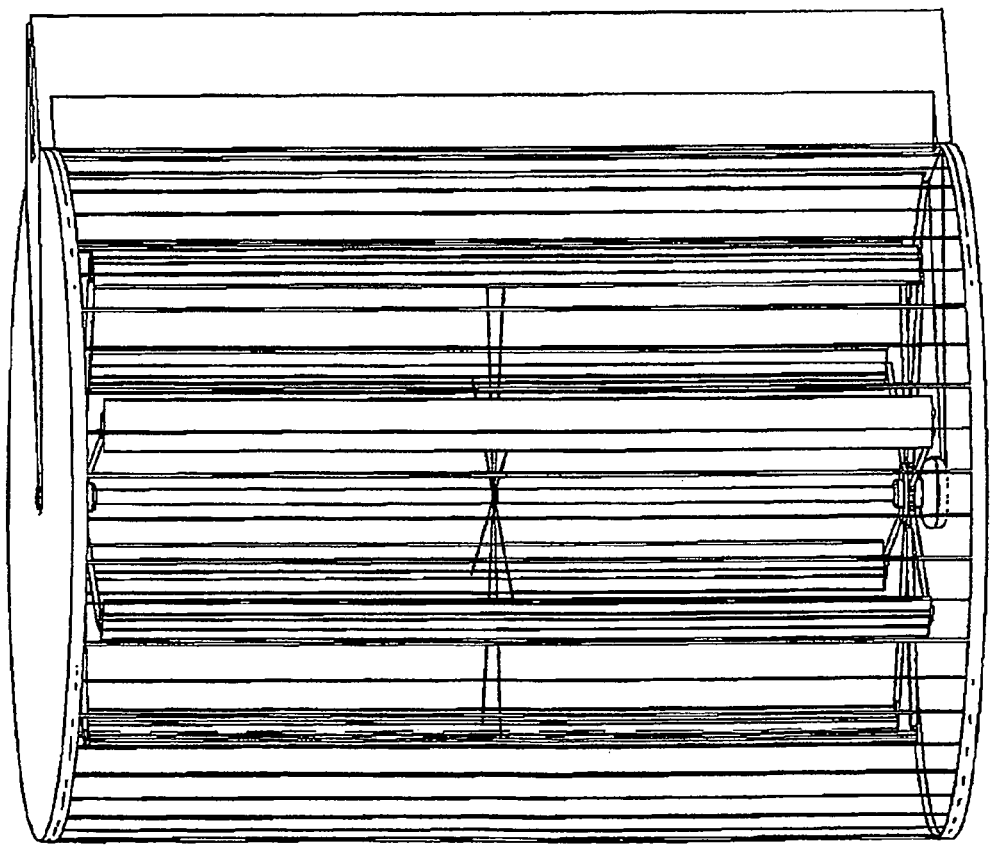
FIG. 13 is a perspective view of the wind power turbine power generator of FIG. 9 with its axis of rotation oriented vertically with an securing attachment.
Figure 14:
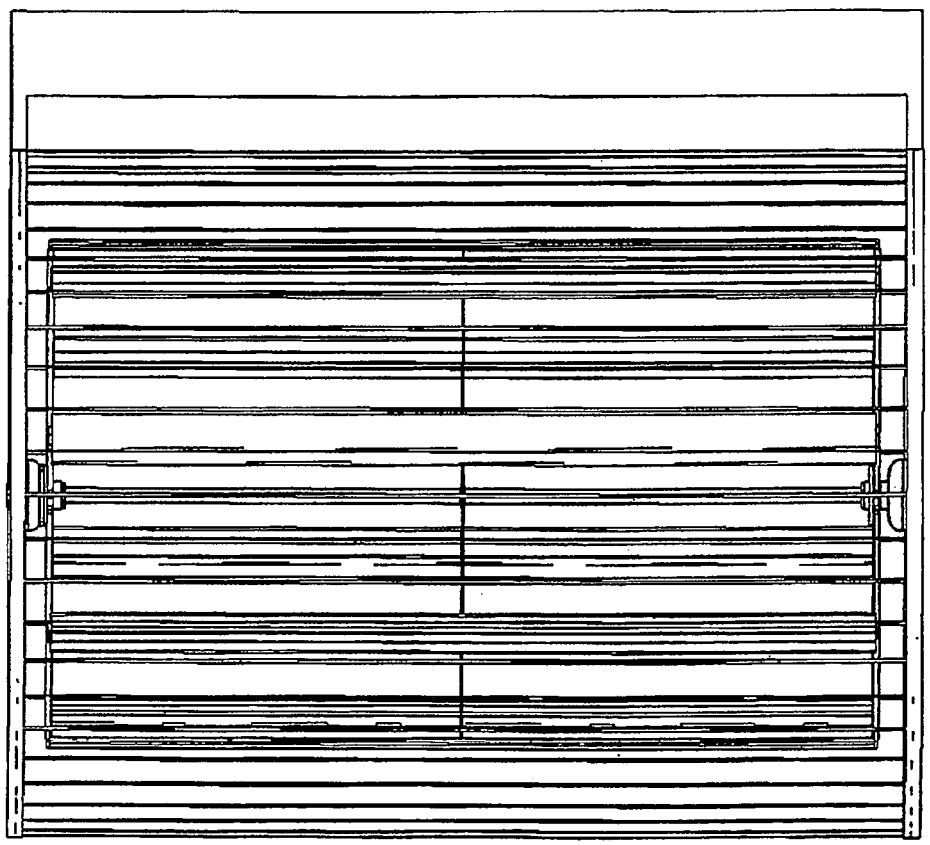
FIG. 14 is a side view of the wind turbine power generator of FIG. 13 showing the base structure.

FIGS. 13 and 14 show the power turbine of FIGS. 3-5 with the axis of rotation oriented vertically.

Figure 15:
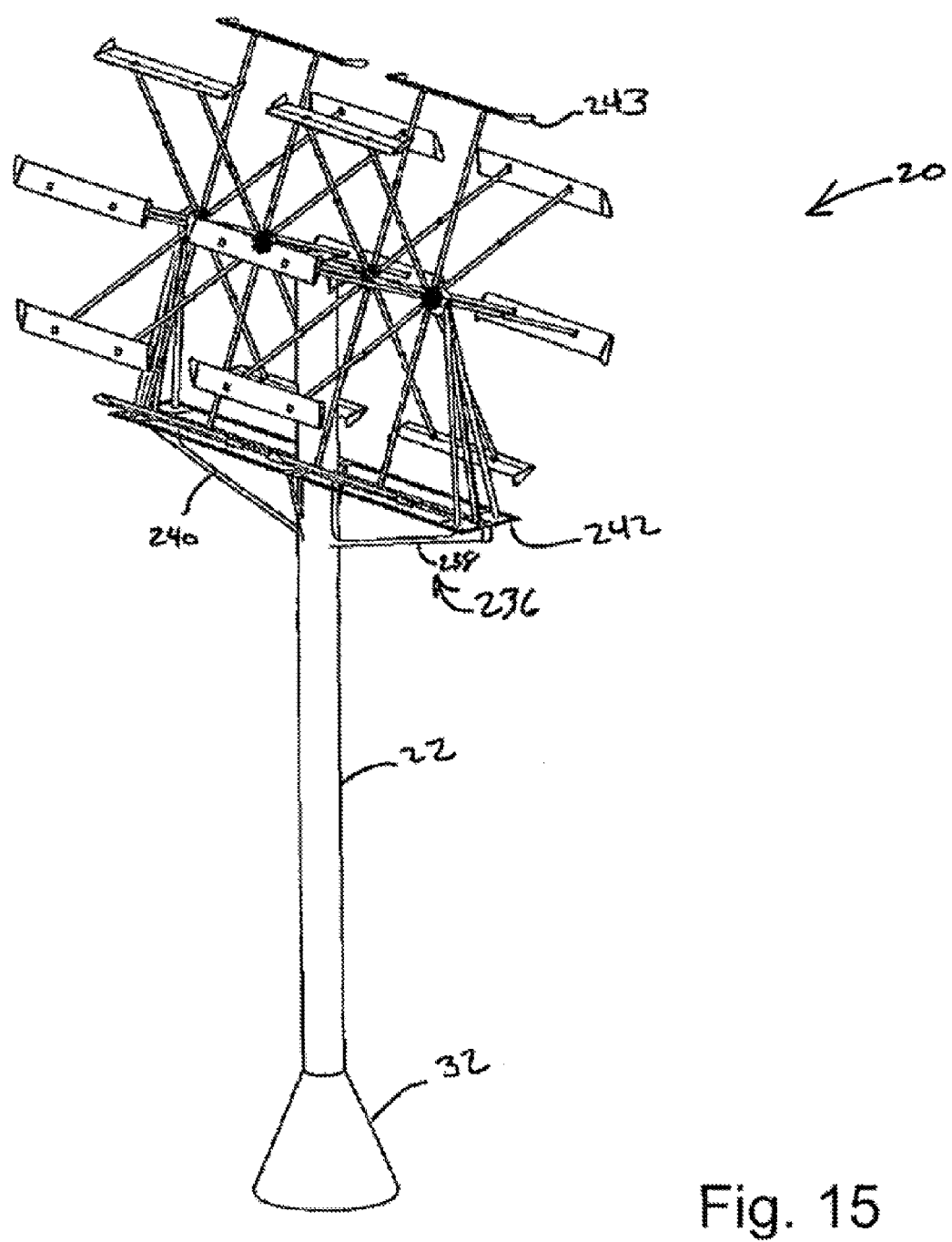
FIG. 15 is a perspective view of the wind turbine of the present invention with its axis of rotation horizontally-oriented and supported on a mast.
Figure 16:
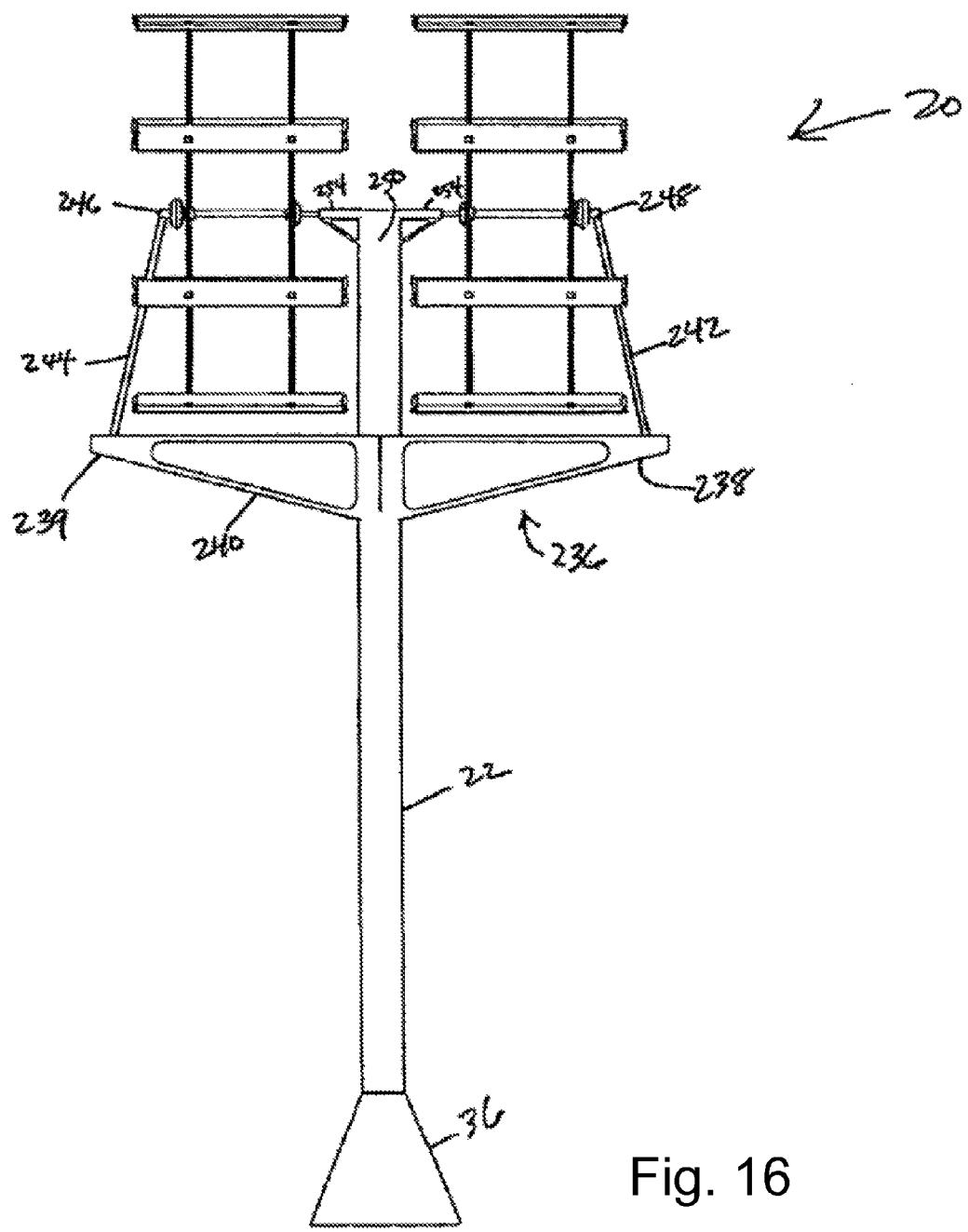
FIG. 16 is a front view of the wind turbine of FIG. 15.
Figure 17:
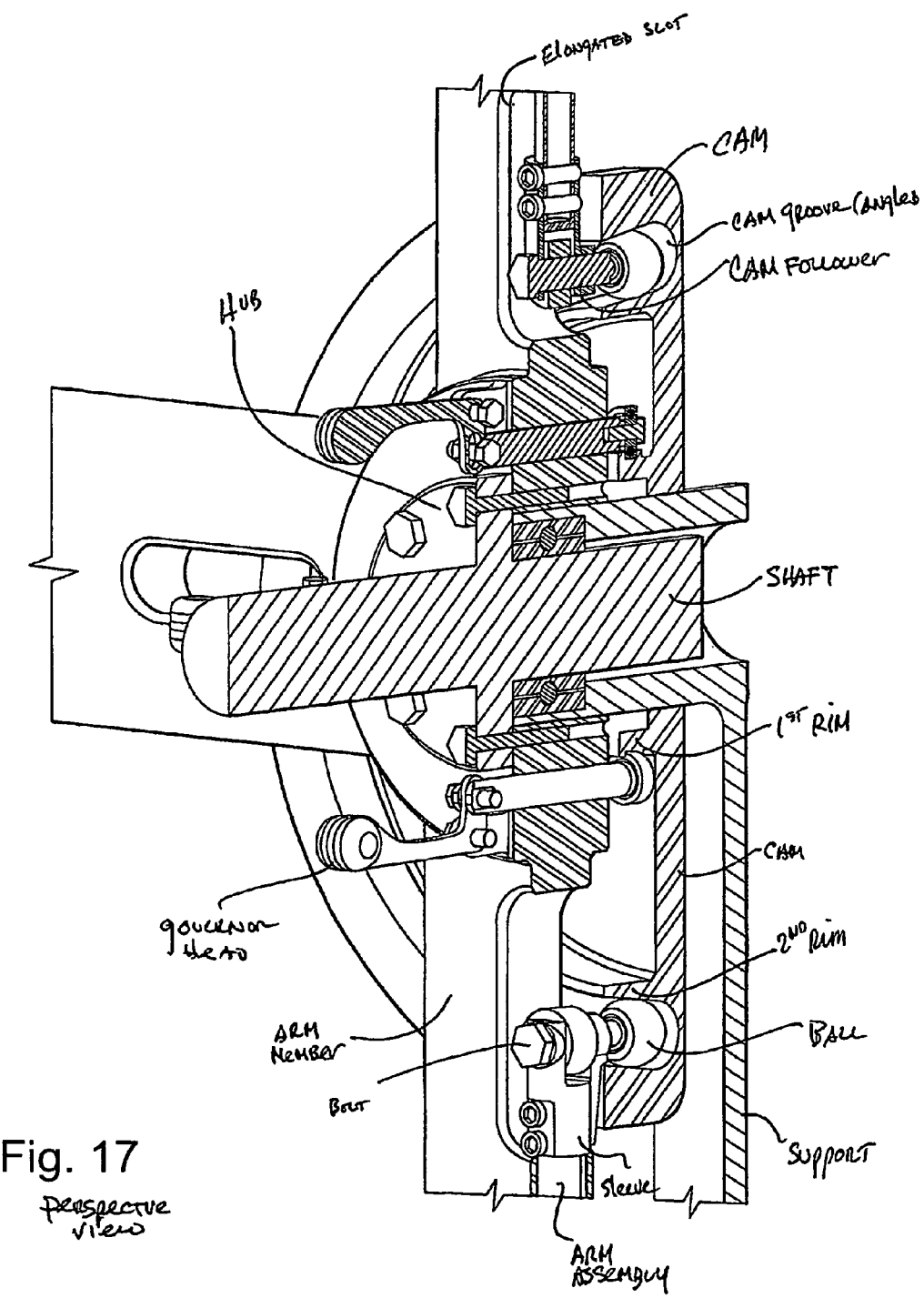
FIG. 17 is a perspective view in somewhat generalize form a cam of the wind turbine power generator with the governor mechanism in an intermediate position.
Figure 18:
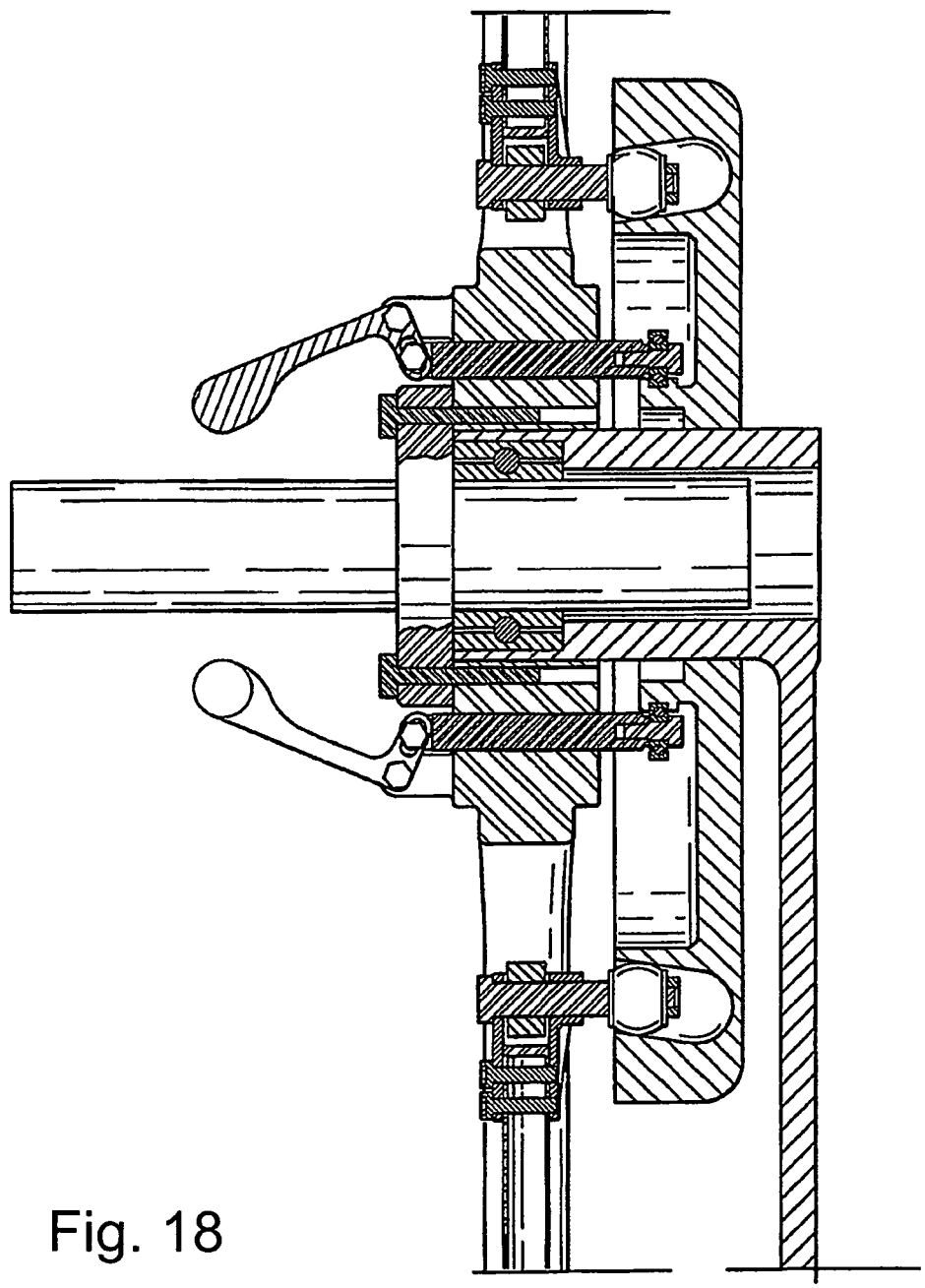
FIG. 18 is a generalized partial sectional view of the wind turbine power generator shown in FIG. 15 with the governor mechanism in under relatively low forces.
Figure 19:
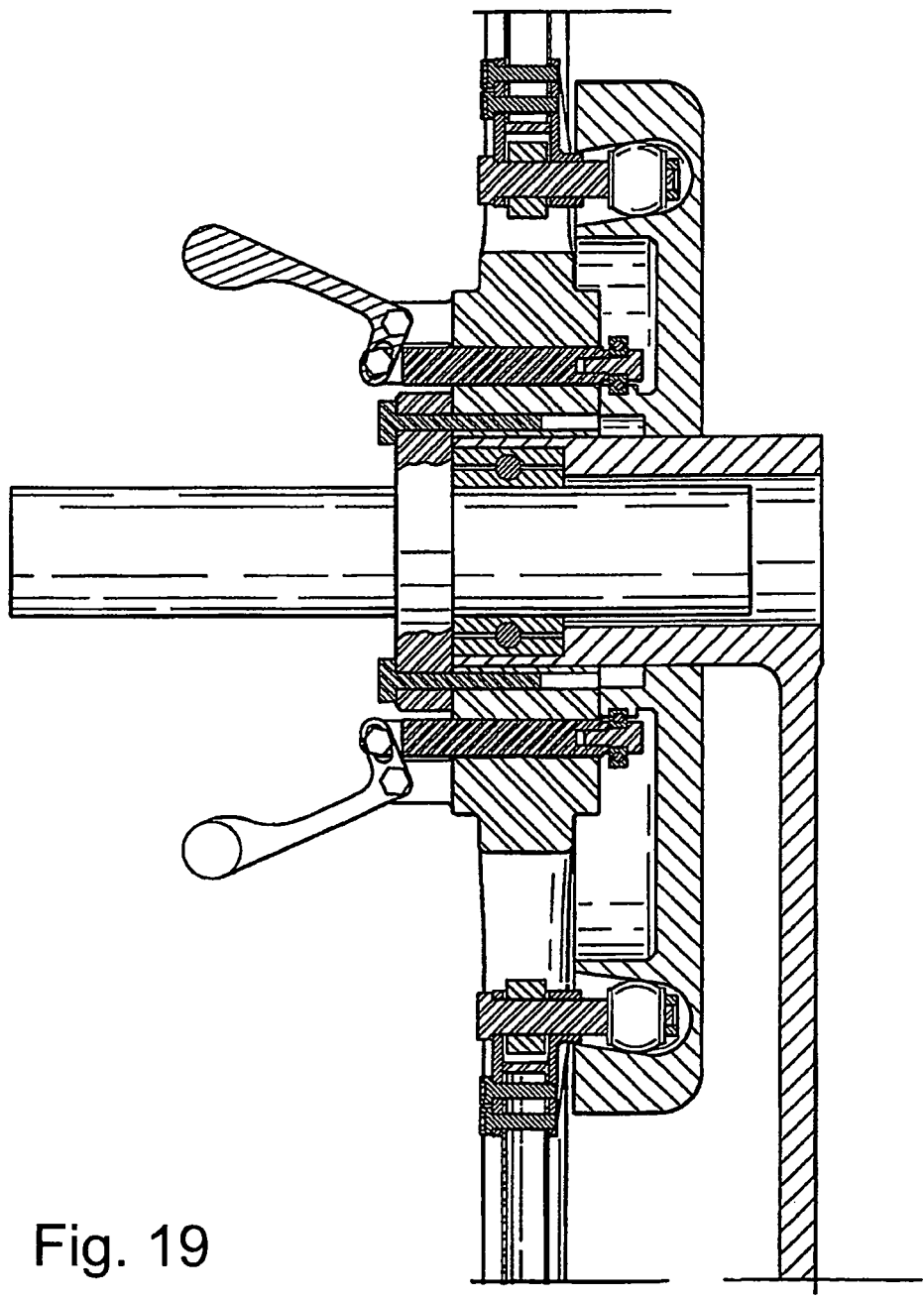
FIG. 19 is a generalized partial sectional view of the wind turbine power generator shown in FIG. 15 with the governor mechanism in under relatively high forces.

FIGS. 15 and 16 show a wind turbine power generator 20 having its axis of rotation oriented horizontally and on-center in relation to support on mast 22. In this embodiment, turbine 20 includes a pair of turbines each having a horizontal axis of rotation attached to its outward facing ends 246 and 248 to hub that is in turn connected via support links 242 and 244 attached in turn to outer ends 238 and 239 of T-bar 236. T-bar 236 may be reinforced with bracing element 240 extending between outer ends 238 and 239. End portion 250 may extend directly from mast 22 or be a separate section added to T-bar 236. End portion 250 forms a T-shape with extending collet arms 254 that receive the inner ends of the shafts. As shown in FIG. 15, and applicable to all other rotor blades disclosed herein for all figures, each rotor blade may include winglets 243 at their respective ends.

Figure 20:
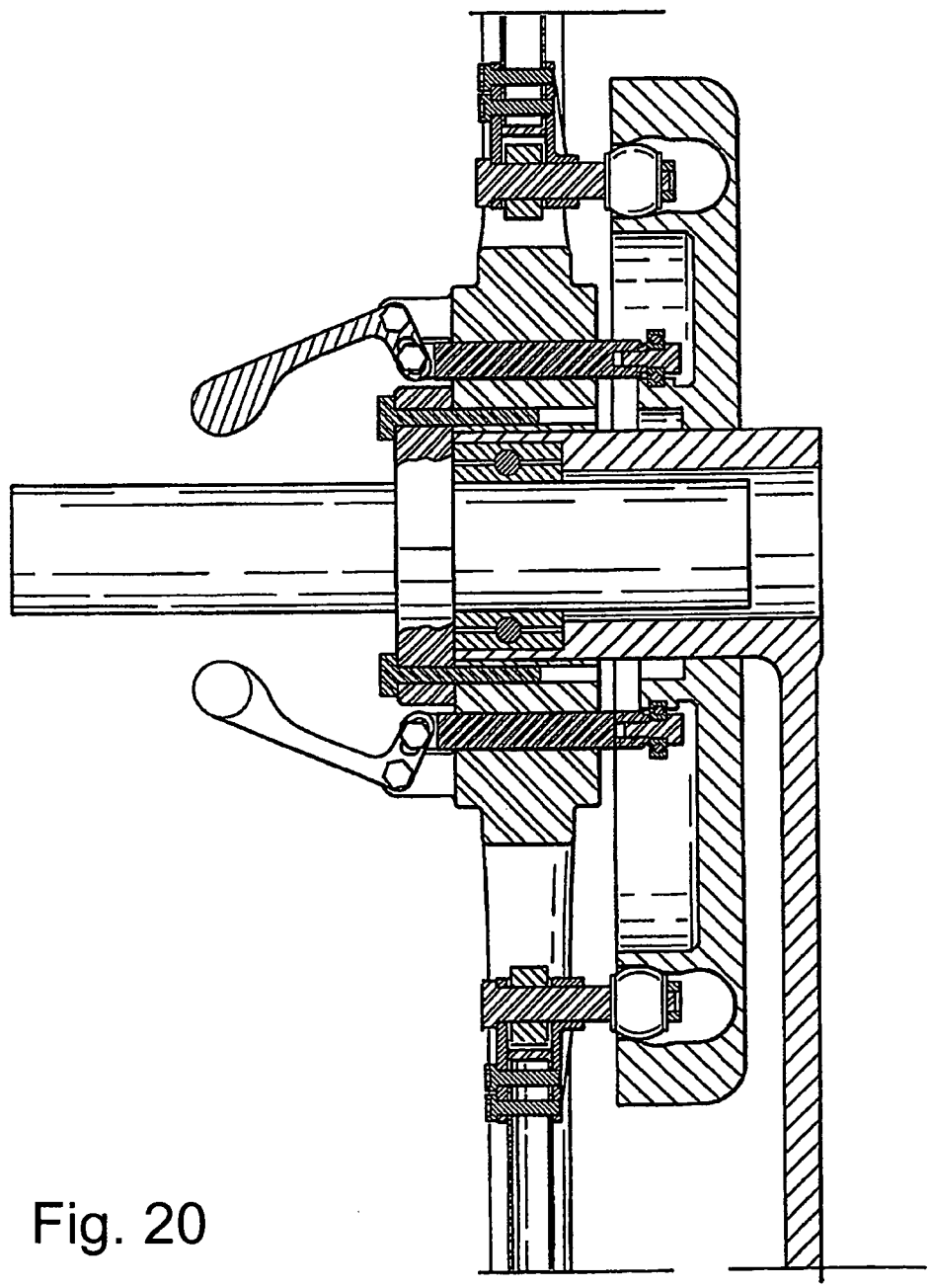
FIG. 20 is a general partial sectional view of a wind turbine power generator with the governor mechanism under relatively low force and showing a variation of the cam groove as disclosed herein.
Figure 21:
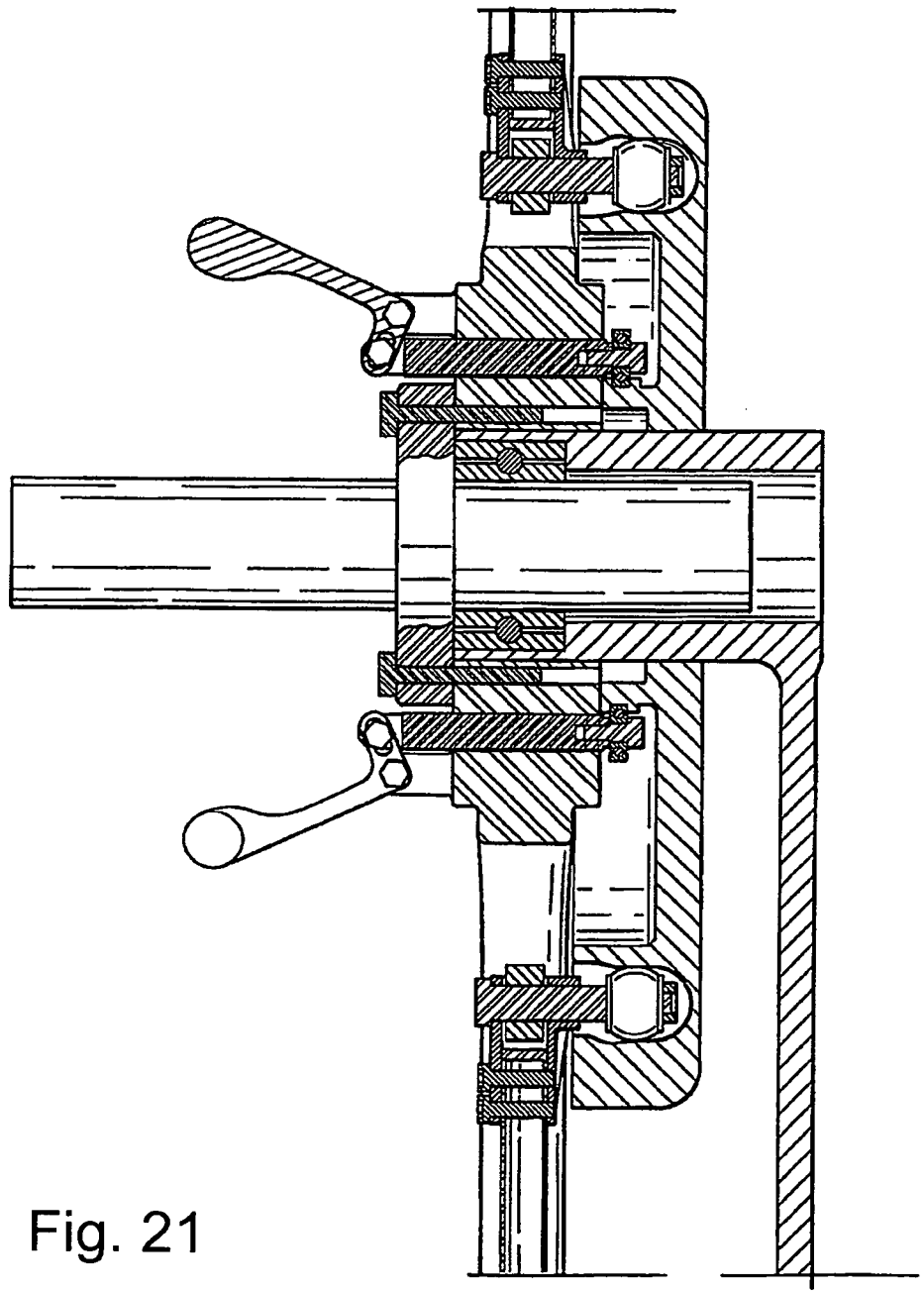
FIG. 21 is another general partial sectional view of the wind turbine power generator of FIG. 20 with the governor mechanism under relatively high force.

FIGS. 17-20 show a modified form of the cam of U.S. Ser. No. 11/505,966 filed Aug. 17, 2006 shown best in unmodified form in FIGS. 6 and 8. The modified cam mechanism alters the speed at which the rotor blades rotate to prevent undue forces such as excessive torque and vibration from damaging the turbine 20 expected at high revolutions per unit time. In one embodiment illustrated in FIGS. 17-19, modified cam includes a governor mechanism comprising an arm having a first end or head and a curved second end or tail that is in turn connected to a linkage having an end that is adjacent to the cam and that has a head portion that has a overhang that fits into a slot in a rim of the cam having a recess. The linkage extends through the hub and holds the cam against the arm member of the rotor blades. As the arm assembly rotates faster about the shaft, the arm head of the governor mechanism moves outwardly away from the shaft through centripetal forces causing the curved end or tail to exert a downward force against the hub and force the cam member away from the arm member. Arm member having arm assembly connected for adjustable angle of attack to rotor blade is accessible in elongated slot at its proximal end. Ball and bolt depend substantially normally from the proximal end of the arm assembly and the ball slidably engages a cam groove formed by the cam and a second cam rim. In the embodiment shown in FIGS. 17-19, the cam groove is angled relative to axis normal to the cam to its opening is positioned relatively closer to the shaft than is the bottom of the groove. As the governor mechanism pulls the cam closer during high revolutions, the cam forces the arm member through the ball in the groove to move further into the grove opening which causes the arm assembly to extend outwardly that, in the starting position shown in FIG. 18, causes the rotor blade to rotate in a manner that reduces its angle of attack and lift to thereby reduce the speed of rotation. FIGS. 20 and 21 substantially correspond to FIGS. 18 and 19 but showing a modified angled cam groove that has an angled portion near the opening of the cam groove and a substantially linear portion. In another embodiment (not shown) the cam groove is linear and the opposing force against the arm assembly is provided by a spring or mechanical linkage between the cam and the hub. The construction and operation of the power generator embodiments described hereinbefore is believed to be understandable to those of ordinary skill in the art. Conventional engineering materials and fabrication practices may be used to construct and assemble the components of the generators. Although preferred embodiments have been described in detail herein, those skilled in the art will also recognize that various substitutions and modifications may be made without departing from the scope and spirit of the appended claims.

What is claimed is:

1. A wind turbine power generator comprising:
 A rotor comprising an array of rotor blades disposed about an axis of rotation of the rotor, each rotor blade pivoting at a pin and being connected to a pitch control linkage operable to control the pitch of the rotor blade;
 a blade pitch control mechanism comprising a cam, a governor mechanism operable to control the speed at which the rotor blades rotate and an array of cam followers, each operably connected to a blade pitch control linkage for a rotor blade, wherein the cam has a surface profile which varies along the direction of the axis of rotation of the rotor.

2. The wind turbine power generator as set forth in claim 1, wherein the governor mechanism varies the axial position of the follower on the surface of the cam according to rotor speed.

3. The wind turbine power generator as set forth in claim 1, wherein the governor mechanism operates according to centripetal forces.

4. The wind turbine power generator as set forth in claim 1, wherein the governor mechanism reduces the angle of attack of the blades as the rotor speed increases.

5. The wind turbine power generator as set forth in claim 1, wherein the governor mechanism comprises an arm having a first end and a second end connected to a linkage having an end adjacent to the cam.

6. The wind turbine power generator as set forth in claim 5, wherein the linkage has a head portion having an overhang that fits into a slot in the cam.

7. A wind turbine power generator comprising:
 A rotor comprising an array of rotor blades disposed about an axis of rotation of the rotor, each rotor blade operable to pivot about an axis parallel to the axis of rotation of the rotor and being connected to a pitch control linkage operable to control the pitch of the rotor blade;
 a blade pitch control mechanism comprising a governor mechanism operable to control the speed at which the rotor blades rotate, a cam having a surface profile and an array of substantially-spherical cam followers, each cam follower operably connected to a blade pitch control linkage for a rotor blade, wherein the surface profile of the cam varies along the direction of the axis of rotation of the rotor.

8. The wind turbine power generator as set forth in claim 7, wherein the governor mechanism varies the axial position of the follower on the surface of the cam according to rotor speed.

9. The wind turbine power generator as set forth in claim 7, wherein the governor mechanism operates according to centripetal forces.

10. The wind turbine power generator as set forth in claim 7, wherein the governor mechanism reduces the angle of attack of the blades as the rotor speed increases.

11. The wind turbine power generator as set forth in claim 7, wherein the governor mechanism comprises an arm having a first end and a second end connected to a linkage having an end adjacent to the cam.

12. The wind turbine power generator as set forth in claim 11, wherein the linkage has a head portion having an overhang that fits into a slot in the cam.

13. A wind turbine power generator comprising:
 A rotor comprising an array of rotor blades disposed about an axis of rotation of the rotor, each rotor blade having a variable pitch angle about an axis parallel to the axis of rotation of the rotor and being operably connected to a linkage operable to control the pitch of the rotor blade;
 a blade pitch control mechanism comprising a governor mechanism operable to control the speed at which the rotor blades rotate, a fixed cam having a three-dimensional surface profile and an array of substantially-spherical cam followers, each cam follower operably connected to a blade pitch control linkage for a rotor blade, wherein the surface profile of the cam varies along the direction of the axis of rotation of the rotor and the cam followers are translatable over the surface of the cam along the direction of the axis of rotation of the rotor.

14. The wind turbine power generator as set forth in claim 13, wherein the governor mechanism varies the axial position of the follower on the surface of the cam according to rotor speed.

15. The wind turbine power generator as set forth in claim 13, wherein the governor mechanism reduces the angle of attack of the blades as the rotor speed increases.

16. The wind turbine power generator as set forth in claim 13, wherein the governor mechanism comprises an arm having a first end and a second end connected to a linkage having an end adjacent to the cam.

17. The wind turbine power generator as set forth in claim 16, wherein the linkage has a head portion having an overhang that fits into a slot in the cam.

\* \* \* \* \*